Sept. 23, 1930.   P. UNGER   1,776,711
METHOD FOR PRODUCING THE TEETH ON FILES, SAWS, AND SIMILAR TOOLS
Filed Feb. 9, 1929

Inventor
Paul Unger.
By Emay, Booth, Janney & Varney
his Attorneys

Patented Sept. 23, 1930

1,776,711

UNITED STATES PATENT OFFICE

PAUL UNGER, OF REMSCHEID, GERMANY

METHOD FOR PRODUCING THE TEETH ON FILES, SAWS, AND SIMILAR TOOLS

Application filed February 9, 1929, Serial No. 338,864, and in Germany April 30, 1927.

This invention relates to a method and apparatus for the production of the teeth on files, saws and other tools.

Understanding the difficulties of the planing of teeth in the file body and the inconveniences connected with the tooth shape produced in this manner it has recently been proposed to produce the undercut teeth of files and similar tools by means of a milling cutter. The cutting of file teeth by a milling cutter makes it not only necessary to keep in store a special cutter for each kind of file to be cut, whereby cost of manufacture is increased, but presents the further inconvenience that this expensive tool becomes useless as soon as some of the teeth of the cutter are broken.

The advantages of better tooth form due to the production of the file cuts by means of milling cutters, in comparison with the planing of the teeth, are therefore reduced by other inconveniences.

By the method according to this invention the inconveniences connected with the hitherto applied methods and apparatus for cutting teeth in files and similar tools are obviated.

The invention consists in that the cutting of the teeth is effected by means of scraping cutters forming a solid block of cutting teeth, or by means of tools similar to scraping cutters. The continuous teeth of the cutters, subdivided transversely to their longitudinal direction by scraping grooves like saw teeth, are upwardly inclined from the rear to the front and their bevellings increase in thickness from the front to the rear so that the cutting in or planing in of the teeth into the blanks increases gradually along the row of teeth. Herefrom results the advantage that, owing to the increasing cutting depth of the individual scraping cutters, the cutting of the teeth into the blank takes place in one single operation.

Moreover, the metal wall of the preliminary cutting which has been heated by the cutting operation of the first tooth of the broaching member, is subsequently cut away by the following cutting elements of the broach member, before it has time to cool and harden to any appreciable extent. As a result, the cutting edges of the broach remain sharp, and a clean cut is produced, yielding a much sharper and better formed serration on the tool being formed.

It also seems that an improved result is obtained by broaching a plurality of serrations at the same time. Apparently this is due to the support of the metal between the individual broaching members, and the fact that the cutting and supporting action of one member prevents a rolling of the metal edge by the adjacent members.

Compared with the use of milling cutters the further advantage is obtained that even when teeth should break the efficiency of the cutting tools is not impaired as the following teeth continue to cut, whereas a milling cutter becomes useless as soon as one tooth has broken.

The apparatus used for carrying out the new method is illustrated by way of example, in the accompanying drawing in Fig. 1 in front elevation and in Fig. 2 in a section on line 2—2 of Fig. 1.

In a frame $a$ a carriage $c$ serving as blank holder is mounted slidable in a guide $b$. This carriage $c$ has an inclined top surface $d$ on which the blanks $e$ are arranged side by side. Above the carriage a ⊥-shaped tool carrier $g$ is shiftably arranged on a guide $f$ transverse to the carriage $c$. On the bottom surface of the carrier $g$ which is inclined in accordance with the inclined top surface $d$ of the carriage $c$ a plurality of cutting tools $i$ are clamped. The cutting tools, each of which consists of several rows of cutting teeth, are arranged next to one another to form a solid rigid body, the scraping cutter-like cutting teeth of which extending from the rear to the front, are subdivided similar to saw teeth by scraping grooves $l$ spaced at uniform distances and extending transversely to the rows of teeth, the chips being discharged through said scraping grooves.

Figure 1:
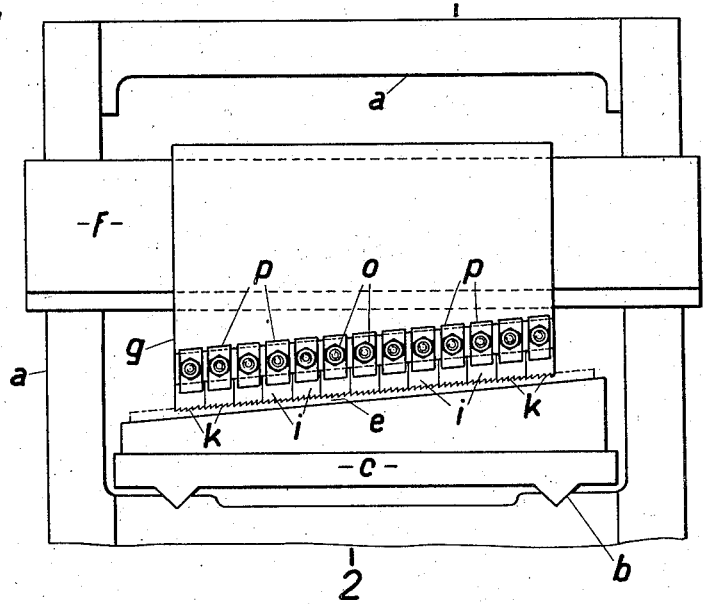
Figure 3:
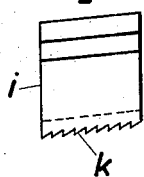
Fig. 3 shows in end elevation a curry comb like cutter block on larger scale.
Figure 4:
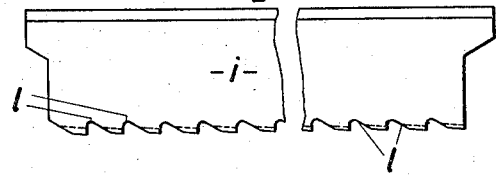
Fig. 4 is a side elevation of Fig. 3.
Figure 2:
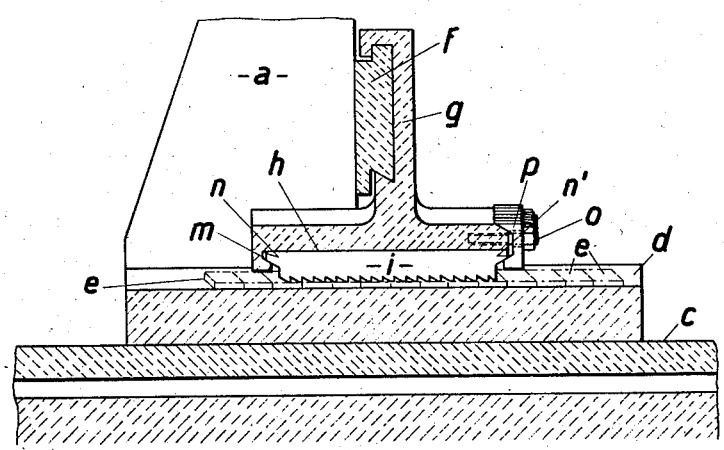

The teeth $k$ are upwardly inclined from the rear to the front (Fig. 1) and bevelled so that the front tooth of the tool roughs out, the cutting depth increasing from tooth to tooth so that the teeth cut gradually deeper into the blanks *e* on the carriage *c* so that the cutting is completed at one pass of the tool. The tools *i* forming one block of teeth like a scraping cutter are clamped—according to the inclined bearing surface of the carriage—the one behind the other (Fig. 2) or the one at the side of the other (Fig. 1) on the upwardly inclined base surface of the ⊥-shaped carrier *g* adjustable on the carriage guide *f*. The carrier *g* has on the one long edge a groove *m* into which the edge *n* of the cutting tool is to be inserted, the other edge *n* of which is pressed on by a clamp *p* tightened by means of a screw *o*. At the reciprocating movement of the carriage *c* carrying the blanks *e* a whole group of files is cut at the same time.

The new method presents, compared with the cutting of teeth by means of milling cutters, further the advantage, that even when teeth should break the efficiency of the tools is not impaired, as the following teeth continue to cut, in opposition to cutters which become quite useless as soon as a tooth breaks and have to be replaced by a fresh cutter. By the inclined surface of the carriage on which the blanks are resting and by the corresponding upwardly inclined clamping of the tools undercutting of the teeth to be cut on the files is produced.

In the accompanying claims; the term "serrated tools" is intended to mean tools such as files, saws and the like, which are provided with surface serrations forming cutting edges capable of being formed by surface broaching as herein set forth; and the term "broaching" is intended to designate the removal of the metal by the action of a plurality of cutting teeth which may move in a substantially linear direction and are of progressively greater cutting depth, so that the serrations in the surface are broached out or scraped out in a single continuous operation.

I claim:—

1. The process of cutting accurately shaped teeth on files, saws, and similar serrated cutting tools requiring sharp tooth edges which comprises holding the blank at a slight inclination to the horizontal and producing all the teeth simultaneously and in a single continuous operation by broaching away the metal between all the teeth simultaneously while supporting the metal forming the teeth at both sides clear to the tooth edge, thereby producing sharp undercut teeth and preventing rolling of the tooth edge.

2. The method of cutting sharp edged teeth on files, saws, and the like, which comprises mounting a plurality of blanks side by side upon the inclined top surface of a carriage with their portions to be cut forming a continuous surface, broaching away the metal of successive blanks simultaneously to leave sharp teeth upstanding and undercut while supporting the metal forming the teeth from both sides to prevent rolling of the tooth edge, said broaching operation comprising a continuous steady draw traversing all said blanks whereby irregularities in tooth formation are avoided.

In testimony whereof, I have signed my name to this specification.

PAUL UNGER.